US012547960B1

(12) United States Patent
Miller, III et al.

(10) Patent No.: US 12,547,960 B1
(45) Date of Patent: Feb. 10, 2026

(54) SYSTEM AND METHOD FOR STRATEGIC MANAGEMENT AND EXECUTION OF A PORTFOLIO OF COMPLEX PROJECTS ACROSS MULTIPLE ORGANIZATIONS AND USERS

(71) Applicant: Checkmate Legal Solution, LLC, St. Louis, MO (US)

(72) Inventors: James Y. Miller, III, St. Louis, MO (US); Lori T. Miller, St. Louis, MO (US)

(73) Assignee: Checkmate Legal Solution, LLC, St Louis, MO (US)

( * ) Notice: Subject to any disclaimer, the term of this patent is extended or adjusted under 35 U.S.C. 154(b) by 556 days.

(21) Appl. No.: 16/748,801

(22) Filed: Jan. 21, 2020

Related U.S. Application Data

(60) Provisional application No. 62/793,934, filed on Jan. 18, 2019.

(51) Int. Cl.
*G06Q 10/0637* (2023.01)
*G06N 5/04* (2023.01)
(Continued)

(52) U.S. Cl.
CPC ......... *G06Q 10/06375* (2013.01); *G06N 5/04* (2013.01); *G06N 20/00* (2019.01);
(Continued)

(58) Field of Classification Search
CPC ....... G06Q 10/06375; G06Q 10/06311; G06Q 10/06313; G06Q 10/06316;
(Continued)

(56) References Cited

U.S. PATENT DOCUMENTS 5,875,431 A 2/1999 Heckman et al.
8,055,529 B1 * 11/2011 Jackson ............. G06Q 10/0639
705/7.29
(Continued)

OTHER PUBLICATIONS

Mitratech TeamConnect Legal Software Suite's New Dashboard Aids Decision-Making, Optimizes Operations. PR Newswire [New York] Oct. 25, 2005: 1.*

(Continued)

*Primary Examiner* — Timothy Padot
(74) *Attorney, Agent, or Firm* — Campbell IP; Dutro E. Campbell, II

(57) ABSTRACT

The present invention is directed to a software-based technology system for managing and executing high volumes of work on complex projects across multiple organizations involving multiple users that results in superior outcomes at significantly reduced time and cost. Litigation is the initial application of this invention; each case is handled as a project. As applied to litigation, the system of the invention empowers a novel method of end-to-end case assessment, planning, execution and management by integrating tools, processes and procedures allowing for more informed decision-making and deliberate execution of all case-related actions as well as enhanced coordination and communication among all constituents, resulting in efficient achievement of targeted outcomes. The system provides intuitive, menu-driven functionality for inputting, processing and utilizing vast amounts of information, including company and case-specific information, attorney discretionary evaluation and input, document templates and monitoring and reporting requirements. A threat algorithm cross-correlates via multivariate analysis critical data points with customized company-specific information and business logic to generate a numeric threat score as an output. The system also predicts (Continued)

the expected settlement range with a high degree of precision for a specific case as the output of one or a combination of multiple artificial intelligence (AI)/machine learning algorithms. The system then generates a unique case strategy (which includes an expected outcome, including projected outcome, Case Plan and estimated attorneys' fees and costs). System logic learns from thousands of examples of similar cases and directs highly effective and efficient execution of a specific Case Plan providing each attorney and staff member assigned a role in a case with a prioritized task list that is updated in real time as other users complete tasks and litigation priorities change. For each user, the system integrates assigned tasks across multiple cases and multiple client portfolios into a single, prioritized task list. The execution features become increasingly valuable given the volume and complexity of projects across multiple organizations and users, allowing users to focus on their area of expertise and avoid the wasted time and distraction of trying to determine what they should be working on or recording notes to communicate what they have been doing since the system automatically performs these functions and directs the various users' next steps while monitoring their progress against the plan. Integration of administrative functions, including automated time tracking, billing and reporting without the need to rely on users to update this information, further increases quality and efficiency of legal services. Key objectives of the system of the present invention include eliminating gaps between business objectives and litigation strategy and optimizing communication and coordination of case-related tasks and priorities in a fully automated fashion, which are all achieved by leveraging data and technology to enable a fundamentally different approach that becomes smarter and more precise via machine learning and predictive modeling.

16 Claims, 4 Drawing Sheets

(51) Int. Cl.
  *G06N 20/00* (2019.01)
  *G06Q 10/0631* (2023.01)
  *G06Q 10/0635* (2023.01)
  *G06Q 10/10* (2023.01)
  *G06Q 50/18* (2012.01)

(52) U.S. Cl.
  CPC . *G06Q 10/06311* (2013.01); *G06Q 10/06313* (2013.01); *G06Q 10/06316* (2013.01); *G06Q 10/0635* (2013.01); *G06Q 10/10* (2013.01); *G06Q 50/18* (2013.01)

(58) Field of Classification Search
  CPC .... G06Q 10/0635; G06Q 10/10; G06Q 50/01; G06N 5/04; G06N 20/00
  See application file for complete search history.

(56) References Cited

U.S. PATENT DOCUMENTS

| | | | |
|---|---|---|---|
| 8,214,320 B2 | 7/2012 | Derry et al. | |
| 11,010,848 B1* | 5/2021 | Colucci | G06Q 50/182 |
| 2002/0143562 A1* | 10/2002 | Lawrence | G06Q 50/18 |
| | | | 705/311 |
| 2004/0024769 A1* | 2/2004 | Forman | G06F 16/353 |
| 2004/0260876 A1* | 12/2004 | Singh | G06Q 10/10 |
| | | | 711/117 |
| 2005/0240578 A1 | 10/2005 | Biederman et al. | |
| 2006/0212331 A1 | 9/2006 | Lundberg et al. | |
| 2009/0150168 A1 | 6/2009 | Schmidt | |
| 2009/0150906 A1 | 6/2009 | Schmidt et al. | |
| 2012/0005155 A1 | 1/2012 | Lynch et al. | |
| 2013/0231971 A1* | 9/2013 | Bishop | G06Q 10/063114 |
| | | | 705/7.15 |
| 2014/0195396 A1* | 7/2014 | Bhakta | G06Q 40/02 |
| | | | 705/35 |
| 2015/0356697 A1 | 12/2015 | Falcetta et al. | |
| 2015/0371348 A1* | 12/2015 | Magrath | G06Q 10/10 |
| | | | 705/311 |
| 2017/0200227 A1 | 7/2017 | Quinn | |
| 2017/0228655 A1* | 8/2017 | Alarie | G06Q 10/10 |
| 2017/0364827 A1* | 12/2017 | Conrad | G06F 16/93 |

OTHER PUBLICATIONS

J. Bala, M. Kellar and F. Ramberg, "Predictive analytics for litigation case management," 2017 IEEE International Conference on Big Data (Big Data), Boston, MA, USA, 2017, pp. 3826-3830.*
Lexis Nexis, Litigation-Management, Feb. 2014, p. 1, U.S.
Appfolio, Mycase Legal Workflow Automation Software: Customization for Your Cases, 2018, pp. 2-5, U.S.
BPM'Online, Bpm'online CRM Legal. Legal Practice Management Revamped, 2018, pp. 1-3, U.S.
Rocket Matter, Automate and Streamline Your Legal Case Management Workflow with Matter Templates, part of Rocket Matter's law firm software package, 2017, pp. 1-2, U.S.

* cited by examiner

SYSTEM AND METHOD FOR STRATEGIC MANAGEMENT AND EXECUTION OF A PORTFOLIO OF COMPLEX PROJECTS ACROSS MULTIPLE ORGANIZATIONS AND USERS

CROSS-REFERENCE TO RELATED APPLICATIONS

This application claims priority from U.S. Provisional Patent Application Ser. No. 62/793,934 filed on Jan. 18, 2019, which is hereby incorporated by reference.

FIELD OF THE INVENTION

The present invention relates generally to a system and method for strategic management and, more particularly, to a computer-based system and method that optimizes analysis, planning, execution and administration to automate task assignment and prioritization to achieve maximum efficiency. As applied to litigation, the system of the present invention enables targeted investments of time and money to efficiently achieve desired outcomes based upon defined business objectives, a comprehensive case evaluation, a unique case strategy and optimized or streamlined execution of a dynamic case work plan based on expert judgment, a proprietary algorithm that predicts threat level, and AI/machine learning case outcome prediction of settlement range that informs the methodology.

BACKGROUND

Increasingly high cost, gross inefficiency, uncertainty of outcome and unpredictable results are problems companies encounter in all types of litigation and, in particular, in products liability and toxic tort litigation. Gaps between business objectives and litigation planning and strategy, as well as a lack of coordination and communication among constituents working on a specific case are challenges that often plague high stakes litigation matters. The inherent difficulty in managing litigation is especially amplified in toxic tort cases because of the volume of cases, their complexity, their inherent risk, and the fact that they often involve multiple plaintiffs and a significant number of defendants. Because of their enormous scope, risk, and high degree of complexity, this type of litigation also requires the services of highly experienced and relatively expensive legal counsel. Simply keeping track of the vast number of moving parts in thousands of individual cases creates incredible complexity and drives significant expense.

With respect to managing litigation, companies and outside law firms generally employ traditional, highly manual processes riddled with duplicative, inefficient and unnecessary work flows that result in increased costs, heightened risk and inability to meet ever-changing company business needs and expectations. Each case is received and managed in largely similar ways, even though the level of risk and potential outcomes of cases varies greatly. The lack of sufficiently rapid communication among the multiple people involved in managing and working on these cases create inefficiency and risk. The conventional manual processes are largely inadequate for strategically managing a large volume of highly complex cases and achieving optimal outcomes. Further, because outside law firms are typically paid for the number of billable hours they bill, they have no financial incentives to seek ways to increase efficiency, and in fact, they are financially rewarded for inefficiency and creating more billable hours.

Current litigation planning and control systems typically are single point solutions that address only one particular aspect of litigation, such as time tracking, billing, document management, electronic discovery or project management. For example, patent application No. 20090150906 discloses software for automatically managing electronic discovery; Patent Appl. No. 20170200227 discloses a system and method for analyzing electronic invoice data; patent application No. 201450356697 discloses a computer system for centralized storage and devices to display litigation-related data and patent application No. 20050240578 discloses a web-based system for managing performance and expenses and compiling controls and metrics that may be used in evaluating and streamlining future litigation. These prior art systems and methods generally do not integrate multiple functions and lack daily workflow management functionality. Accordingly, they fail to solve the problems of duplicated work and inefficiency that are common in litigation. Most importantly, they all fail to provide a single, streamlined, comprehensive solution that fully integrates all of the complex processes involved in a litigation and simplifies them into a clear set of achievable tasks for each user in a system.

Known practice management systems are broader applications that may integrate a number of discrete aspects of litigation, but are limited in that they essentially do nothing more than attempt to automate the way attorneys and staff work in a highly superficial fashion that still relies on manual processes, thus creating only incremental value. These known solutions do not empower a fundamentally novel approach facilitating attorneys and staff to work differently thereby achieving higher efficiency and optimal outcomes. For example, U.S. Pat. No. 5,875,431 (the "'431 patent") provides a legal strategic planning system and method that predetermines objectives and tasks and includes a series of computer programs that create a template outlining objectives and tasks. The system of the '431 purports to provide a "best practices" strategic process based upon information retained from previously concluded cases of a similar category and type. Additionally, according to the teachings of the '431 patent, the system also dynamically monitors and measures legal cost reporting and billing, dynamically monitors and measures attainment of certain milestone tasks and dynamically monitors and measures deliverables derived from the timely completion of the legal objectives and tasks. Although the system disclosed and taught by the '431 patent purportedly provides a template for objectives and tasks, it does not provide a mechanism for a system to manage, control and drive all case-related activity for all responsible team members in real-time and it does not iteratively assess the risk posed by the case and dynamically update the case plan as risk, variables, timeline or other key factors related to the case change minute by minute. Nor does it facilitate instantaneous, automated, prioritized and coordinated workflow for all responsible personnel across multiple organizations and cases using the computer system's superior view and processing speed of the work being performed. The system of the '431 patent merely examines cases handled in the past, compares the outcomes of those past cases to the desired outcome of a current case and recommends a course of action accordingly; there is absolutely no contemplation of an automated processor that directs the users in real time based on both an assessment of the current priorities and stat of tasks that have been completed. There still exists a need for a system and method that goes beyond merely formulating a course of action based upon a comparison to cases handled in the past by generating a unique case-specific plan driven by a customizable algorithm; there is a need for a system that automatically orchestrates numerous users to complete tasks in synchrony with one another in the most efficient manner possible. The embodiments of the present invention described herein provide technical solutions that address, at least, the needs described above.

SUMMARY OF THE INVENTION

In view of the shortcomings of the prior art, it is an object of the present invention to provide a robust, strategic, cost-effective and efficient system and method for managing large portfolios of complex projects, like litigation, and achieving desired outcomes that is powered by use of scientifically sound data analysis, such as AI/machine learning algorithms, and technology. Other objects and features of the invention will be in part apparent and in part specifically described herein.

In accordance with the present invention, a computer-based system and method for managing litigation that results in superior outcomes at significantly reduced time and cost is provided. The system generates a Threat Score that is based upon weight values that are applied to key variables and that may be created by using a proprietary algorithm that incorporates non-judgment and judgment variables. The system also includes predictive modeling and informs AI/machine learning that is used to determine the expected outcome for a specific case with a high degree of precision. These assessments inform a system generated Case Strategy, which includes the mostly likely outcome, potential investment options and their relative returns on investment so that they may inform and generate the recommended Case Plan. The Case Plan incorporates numerous automated and customized inputs, including but not limited to approved activities with an associated allocated amount of approved time. The system also includes a wealth of information that is populated in the Case Plan, such as standard jurisdictional information, deadlines, specific guidance regarding approved activities and time allotted per activity that is continuously updated based on case deadlines and unique activity. Machine learning algorithms learn from objective data and may be retrained any time new data is available, ensuring that the system keeps getting smarter and generates increasingly more accurate and efficient case assessments and ultimately more precise Case Plan recommendations.

A further object of the present invention is to provide a system and method for managing litigation that coordinates all case-related activity for all responsible personnel across multiple organizations and cases, which includes a system-generated prioritized task list for each responsible attorney and staff member based upon a real time view of the outstanding work against the various Case Plans and priorities. The system dynamically updates the overall case plan and revises the prioritized task lists as the risk, variables, timeline or other material changes occur or other users complete their deliverables. The system directed execution functionality leverages data and machine learning to support optimized workflow across multiple projects/cases in multiple portfolios being managed by multiple users at multiple organizations faster and more accurately that any group of people could manage.

Yet another object of the present invention is to provide a system and method for leveraging historical and new data to inform decision-making and managing litigation that creates a unique case file comprised of approved investment/budget information, relevant documents and templates automatically populated with current and historical information from the company's repository and other data sources which can be updated throughout the litigation process.

Another object of the present invention is to provide a system and method for managing litigation that integrates key administrative processes, including monitoring of the case plan time tracking/billing and reporting, into the day-to-day workflow of all attorneys and staff members assigned to the case. The system enables communication among all constituents and reporting of individual cases or company litigation portfolios on an automated basis without relying on individual users to input information.

Another object of the present invention is the integration of technology, including but not limited to machine learning and artificial intelligence, so that as experience and data in the system grow, the application becomes increasingly accurate and precise. For example, the computer-generated assessment and recommended case strategy will become increasingly precise as insights and understanding of the impact of specific case variables and tasks increase. This improved precision manifests in the computer system outputs, in the form of threat scores, case strategies, recommendations and more precise user task assignments, and reporting.

Another object of the present invention is to provide a method of inputting critical variables (plaintiff, age, judge, jurisdiction, etc.) from a significant number of examples (projects or cases) and using machine learning algorithms to "learn" to estimate likely outcomes.

BRIEF DESCRIPTION OF THE DRAWINGS

The present invention will become more fully understood from the detailed description and the accompanying drawings. The drawings constitute a part of the specification and include exemplary embodiments of the invention, which may be embodied in various forms.

DETAILED DESCRIPTION

Figure 1:
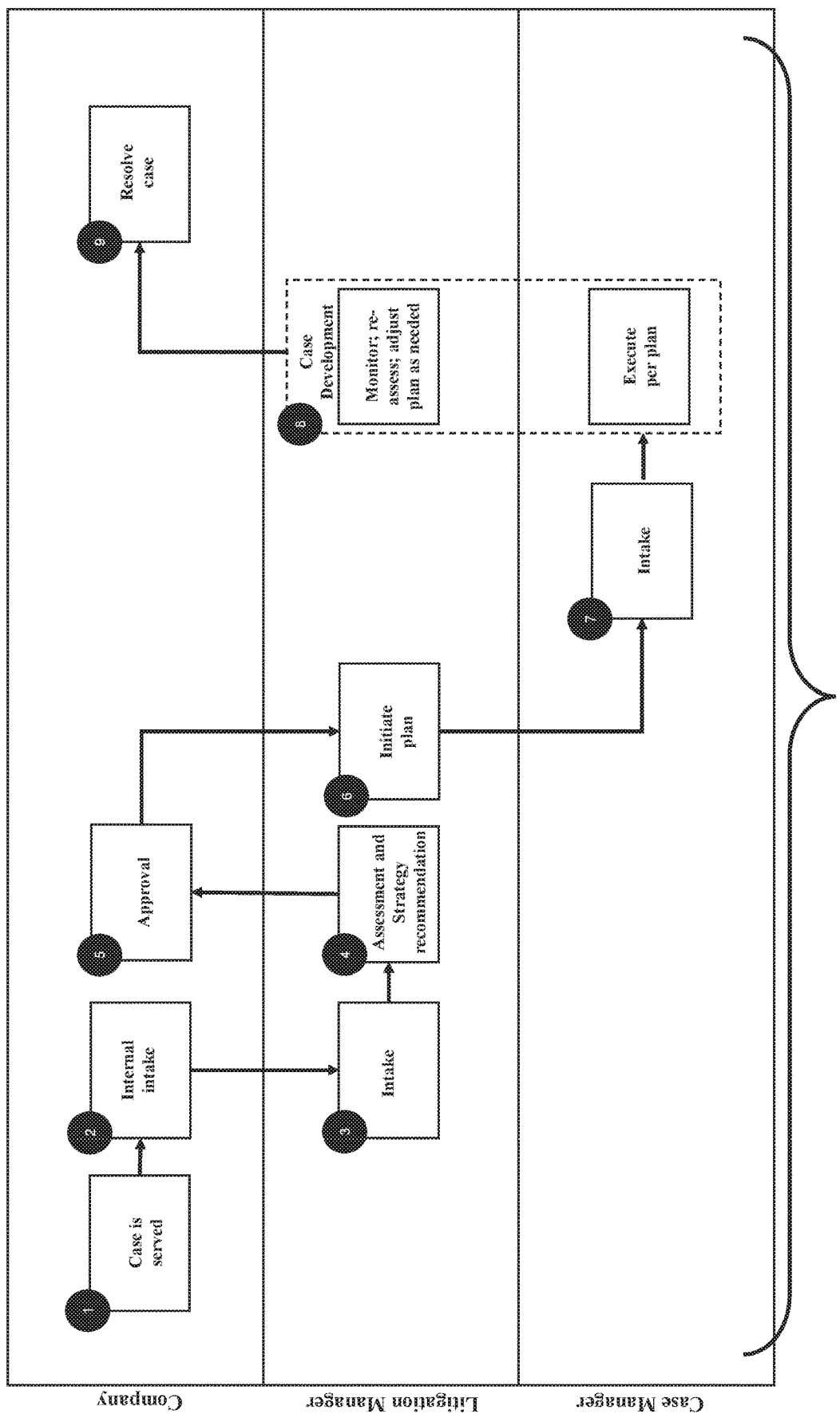
FIG. 1 is a flow chart diagram illustrating the overall litigation process enabled by an embodiment of the present invention.

The following detailed description is merely exemplary in nature and is not intended to and should not be interpreted to limit the embodiments described herein. The following descriptions and illustrations herein should be considered illustrative in nature, and thus, not in any way limiting the scope of the present invention, its application or its uses for all types of litigation and across other industries where organizations struggle to manage a high volume of complex projects across multiple users, organizations and clients.

The following definitions of terms used throughout the specification are provided in furtherance of providing clarity of the description of the system and method of the present invention:

Case File—repository of all case-specific information that grows as additional information becomes known Threat Assessment—comprehensive evaluation of a case that automatically incorporates facts for a specific case along with inputs based on applicable law and discretionary inputs based on attorney insights and experience to generate a threat score and a recommended Case Strategy; key elements of the Threat Assessment can be customized by Company or by case thereby customizing the Threat Algorithm as desired Threat Algorithm—logic coded into the system that interprets the information from the Case Plan in addition to other inputs by the Litigation Attorney and determines a system generated numeric score, the Threat Score Threat Score—numeric output of the Threat Assessment that reflects the overall risk of a case relative to other cases in the portfolio Case Strategy—comprehensive plan that incorporates system generated assessments along with expert evaluation that can be customized by the Litigation Manager or Corporate Counsel and may include expected outcome (dismissal, settlement, verdict); range of settlement (if applicable); Case Plan (including approved activities and time allocation); and projected costs/fees Case Plan—detailed plan that integrates all deadlines and other timeline information with approved activities and time allocation for each; the Case Plan is dynamic and is updated by the system based on changes to deadlines/timelines, completion of work, capacity of team members and any other impactful information Individual Task List—full task list for each team member assigned a role in the case that includes their respective approved activities with deadlines/timelines and approved time allocated per activity Prioritized Task List—system generated list for each team member each day that summarizes their immediate priorities of approved activities and approved time allocation; each user can customize the scope of their integrated task list to include one or more portfolios, in other words, a user can choose to focus on priorities for a single project/case, priorities across multiple projects/cases within a single portfolio, or priorities across multiple projects/cases across multiple portfolios Case File—Dynamic repository of all case information that grows throughout the Case Development process; the Case File integrates manually entered data with other Company, background and historical data in the system; the system may automatically add to the Case File information from the Company and system data repository that is likely relevant and informs all users assigned to the case of the work product that has been provided Litigation Manager—attorney who is overseeing the case through resolution and coordinating among all other attorneys involved in the case; also oversees development and execution of an entire portfolio of cases; the Litigation Manager could be an in-house attorney working with an outside counsel as Case Manager or the Litigation Manager could be an outside counsel taking a broad role in the case as Litigation Manager and Case Manager, alternatively, the Litigation Manager could be outside coordinating counsel working with another outside firm that is assigned as the Case Manager Case Manager—attorney who is handling the case day-to-day after the initial evaluation of the case and approval of the Case Strategy; this could be the same attorney/firm as the Litigation Manager or it could be another outside counsel working as local counsel on a specific case Billing Codes—set of intuitive activity codes that efficiently and descriptively represent the work completed to develop a case and that are correlated to tasks in the Case Plan and validated by attorneys/staff working a task.

FIG. 1 illustrates a process that is enabled by an embodiment of the present invention.

A. Initial Setup

As a new user, a Company identifies the supporting organizations, i.e. outside law firms, who will be assigned roles in managing cases. The Company and all support organizations then assign the users from their respective organizations who will be managing the Company's cases. The system provides an interface to each user's computer where each user completes a detailed user profile for each client portfolio to which they are assigned. The Company can define access rights and other user level rules that will inform the system generated navigation, access to information and task assignment.

A new company using this system then works to input as much foundational information as possible, including company historical and current information, document templates, monitoring and reporting requirements, business objectives and priorities, etc. This material is input or uploaded via user interface employing an intuitive, menu-driven approach that is capable of quickly processing large amounts of information. The system utilized for data input may employ any known methods of data input and aggregation capable of being performed on a general purpose computer or any other device that is capable of accessing and executing cloud-based software and advantageously is configured to be in operable communication with a machine learning system in any one of many ways that are well known to those skilled in the art. As documents are added to the company repository, each document is tagged with a list of key criteria that can later be used to enable the application to push relevant information to specific case files or to support specific tasks being executed during development of the case.

Next, the Threat Algorithm used in the Threat Assessment is customized with company-specific business logic. The Threat Algorithm is the result of a process to identify key variables for the applicable type of litigation and to define a range of potential values for each variable and the expected impact each variable has on the particular case. The system enables the user to weigh variables accordingly and to modify potential values and expected impact to generate a Threat Assessment output that is uniquely aligned with the company's particular business objectives.

During Initial Setup, the company-specific protocols for review/approval of work product and prioritization of tasks for a case and tasks among multiple cases are customized.

B. Case Served

With reference to FIG. 1, upon completion of set up, deployment of the system and method of the present invention is initiated upon a new case being served upon the company 1. This is the formal initiation of the litigation process.

C. Corporate Internal Intake

As shown in FIG. 1, Corporate Internal Intake 2 follows service of the case. At the Corporate Internal Intake 2 stage, company legal staff validate the case to ensure the company is an appropriate defendant and notify the Corporate Counsel and other internal company constituents; the Litigation Manager is assigned (the Litigation Manager is often an attorney from an outside law firm). Key information about the case and confirmation of completion of all internal processes (risk management, budgeting, insurance review, legal hold, defense tender, and cross-functional partner notification) are input into the system Case File. The system triggers notification to the Litigation Manager. The various inputs for Threat Assessment variables and additional data points in the Case File will continue to emerge through development of the case and will be continuously added to the Case File.

D. Litigation Manager Intake

As indicated in FIG. 1, following Corporate Internal Intake, the Litigation Manager Intake occurs, where the Litigation Manager acknowledges receipt of the case in the system and completes necessary internal intake steps, including setting up billing and clearing conflicts. Once administrative steps are completed, the Litigation Manager accepts the case in the system.

E. Initial Case Evaluation

The Litigation Manager adds all available information, including specific facts and information from the complaint, to the Case File, which will continue to grow as additional information becomes known. The Threat Assessment automatically incorporates facts from the Case File in addition to other facts and discretionary information input by the Litigation Attorney and then runs the data through the Threat Algorithm to generate a Threat Score and other system generated assessments including predicted outcome, a unique Case Strategy, including an expected outcome, expected settlement/verdict range (if applicable), Case Plan, and projected cost/fees based upon the Case Plan, default assigned roles and responsibilities and applicable billing rates.

These inputs and variables will be automatically incorporated into the Case File, but the user may also manually add or adjust inputs and variables as necessary. The initial Threat Assessment for a case will indicate whether all critical variables are captured and will provide an associated level of confidence in the result, based upon data available at that time. As the case progresses, additional data and information becomes available and is incorporated into the Threat Assessment, thereby increasing the confidence level of the results.

The Case Plan incorporates the specified tasks for a case and the unique timeline for a given case, reflects all users assigned a role and specific tasks in the case and allocates time and budget for each assigned activity. The timeline may be uploaded if source data is available or else will be manually input and updated as needed by assigned staff. The Litigation Manager reviews the system generated Case Strategy, customizes if appropriate, then triggers a summary of the Recommended Case Strategy for Corporate Counsel review. The use of the case-specific Work Plan ensures that unnecessary work is avoided, particularly for cases that pose relatively minimal risk, while also ensuring critical steps are executed for cases that poses greater risk. The system will be flexible to allow users to trigger alerts and recommendations out of sequence based on the availability of data or discretion of attorneys.

F. Company Approval

The Corporate Counsel receives a notification from the Litigation Manager that includes a customized view of the Case File, the Threat Score generated by the Threat Algorithm and other machine learning (M.L.) assessments with an accompanying narrative of the threat drafted by the Litigation Manager, and a Recommended Case Strategy. Corporate Counsel then reviews the Threat Assessment and Recommended Case Strategy. Depending on the case, the Corporate Counsel may choose to simply review and approve an approach or may require a meeting with the Litigation Manager to discuss the recommendation first. Concerns or modifications to the recommendation are captured in the system and flagged to the Litigation Manager for review. The Corporate Counsel and Litigation Manager can iterate the Recommended Case Strategy until the Corporate Counsel is comfortable and then formally approves the Case Strategy.

G. Plan Initiation

Once a strategy is approved, the system triggers a notice to the Litigation Manager and the next step, as shown in FIG. 1, is Plan Initiation. More specifically, the system logic creates the detailed Case Plan and unique Case File. A detailed and dynamic index indicates sources/inputs for all documents and information. Appropriate documents and templates are organized by the system in the Case File and populated with current information from the company repository and other data sources. Throughout the litigation process, any updates to underlying company information is updated and flagged in the Case File. The Case File also includes the approved investment/budget as part of the Case Plan.

The system auto-generates a specific file structure for the Case File and populates the Case File with relevant documents, including all associated historical company documents from the company data repository that are relevant to the claims and defenses. The system also provides a summary of the potential significance of this information. The system also generates and populates the Case File with litigation tools that will be used to help develop the case, including a timeline, chronology, proof matrix and defense plan. The system further generates and populates the Case File with resource documents relevant to the claims and defenses utilizing past work product, historical information and background documents and provides a summary of the potential significance of this information. The system also generates and populates templates for responsive pleadings, motions, examination outlines, exhibit list, witness list and arguments leveraging current best practices and prior work product/knowledge. Additional data will be added by legal staff, if appropriate, and this supplemental information will be captured in the company data repository for ongoing use in current and future cases.

Once a Case File is set-up with initial information, documents, tools, resources and templates, notification is sent to the Corporate Counsel, including an index of the newly created file and a summary of significant company and resource information relevant to the case for review.

The Litigation Manager assigns roles for attorneys, paralegals and staff from their firm assigned to the case and assigns the Case Manager in the system. The Case Manager may be an attorney at the same firm as the Litigation Manger or this could introduce a new firm/local counsel. The Litigation Manager (and later in the process the Case Manager) can always change role assignments for a specific case but details about the roles are established during initial setup and are used as a default.

H. Case Manager Intake

As shown in FIG. 1, following the Plan Initiation 6 and as part of the Case Manager Intake 7, the Case Manager receives an alert with the Case File through the system that they have been assigned a new case. The Case Manager acknowledges receipt of the new case in the system and completes any necessary administrative steps (if the Case Manager is at a different firm than the Litigation Manager, including billing setup and conflicts). The Case Manager confirms when conflicts are cleared and accepts the case in the system.

The Case Manger then receives additional details of the case via system generated notification that includes a Threat Assessment narrative, the Case File index and access to the Case File and the Case Plan (including approved activities, time allocation and budgeted cost based on default hourly rates per role).

The Case Manager then assigns roles for the case in the system which then pushes Individual Work Plans to each person assigned a role in the case. All team members (assigned by Litigation Manager or Case Manager) acknowledge their assignment and confirm availability (adjusting their capacity in the system accordingly.) Changes to staff and attorney capacity will adjust the Case Plan and Individual Work Plans.

I. Case Development

All attorneys and staff assigned roles in the case begin executing per their Individual Prioritized Work Plans 7, preparing pleadings, fact discovery and expert discovery. Any information manually input or supplemental to the information already included in the company repository is evaluated for inclusion in the repository going forward. Any new or additional information to the company repository is incorporated into all active case files with audit trail and flags. Changes to the case assessments, deadlines or attorneys/staff working assigned to the case are input and the system dynamically updates the overall and individual Case Plans, which all attorneys and staff may access through their user interface (i.e., their computer). Any delays are flagged for the Case Manager to review and extended delays are escalated to the Litigation Manager via system alerts. The Litigation Manger and Corporate Counsel determine how often they want to receive updates but always have access to real time information in the system. Any case development flagged as material triggers updates to the Case Manager and Litigation Manager. These flags and triggers are an important element in case development and are intended to reduce the massive amount of uncoordinated communications that tends to occur via email, text or phone calls. The system enabled workflow features keep appropriate users informed of necessary information within the system environment and within the work flow.

The system generates a prioritized Task List with budgeted time allocation to each team member. For each user in the system who is assigned a role in a case or project, the system generates a prioritized individual task list that directs each user to the specific tasks to be completed next. The Case Manager and Litigation Manager can view and modify assignments and priority. The timeline information that is integrated into a Case Plan is a combination of automated and manual data entry, including Company protocols, jurisdictional regulations, requirements from the judge, and ongoing updates, including depositions etc. Activities are linked to associated resource material and work product templates in the Case File. All activities in the Case Plan are also tied to a Billing Code that is validated by the user when a task is completed along with their actual time spent (to avoid delayed reporting of time and duplicated work).

The system integrates prioritized task lists among multiple cases in a company's portfolio for team members working on multiple cases. Further, the system integrates task lists for a user across multiple company portfolios. The system also integrates task lists among multiple company case portfolios for team members working across multiple companies (could be in house with subs or outside firms), thereby increasing the complexity of execution. The system manages workflow for single tasks that involve multiple users and the workflow is incorporated into the system logic that generates the priorities for the respective users. Task lists can be overridden to accommodate urgent activities, emergencies and escalations.

On an ongoing basis, the Case Plan generates user-specific prioritized task lists that directs their activities on a daily, weekly or an otherwise-defined periodical basis. The Case Plan includes task dependencies, such as required sequencing, review or approval of particular tasks and manages these dependencies upon the generation of user task lists. System enabled workflow management coordinates dependent tasks across users. The system advantageously creates alerts if tasks fall behind schedule or when tasks require review or approval, so that if a due date is at risk or if a deadline is missed, the system alerts the user and leaders supervising the case. The system further provides real time monitoring for performance against budget by task and for the overall case, thereby providing Corporate Counsel and the Litigation Attorney with ongoing visibility of case-related costs. The system may advantageously employ a computer processor or other suitable means known in the art to evaluate case information and prioritize tasks based upon criteria including deadlines, time allocation, approval status and other relevant factors. The system is capable of communicating information relevant to users' task lists via internet or any other suitable electronic means, allowing for the user to view task list information on the monitor screen display of their workflow computer.

Review and approval protocols for deliverables are set up during the Initial Setup for each company. The system routes work product for review and approval throughout the Case Development process. The task level approvals are managed automatically by the system via the execution workflow logic.

Official case documents are associated to specific tasks and saved in the Case File. Other work product, like documented findings from an investigation of a new issue/case law or a memo requesting settlement authority, etc. is created in the system, associated to a specific task and saved to the Case File.

J. Case Resolution

As shown in FIG. 1, following Case Development, final resolution of the case 8 is documented in the system and memorialized in the case file. Final resolution of the case includes resolution status and total investment in the form of dismissal, settlement or verdict and all costs and fees. At this point, the Case File will be locked and changes to data in the company repository will not be incorporated but the information is all searchable and retrievable for future needs.

K. Administration

Key administrative processes, including monitoring of the Case Plan to develop the case, time tracking/billing and reporting are all integrated by the system into the day to day workflow of all attorneys and staff assigned to the case. The system generated Case Plan incorporates inputs including the approved activities and allocated time, deadlines (including all standard deadlines per the jurisdiction, regulations etc. along with case specific deadlines per the judge etc.), attorneys and staff assigned along with their capacity and Billing Codes. The Case Plan includes specific guidance regarding approved activities and time allotted per activity. Time tracking per the coding system embedded in the system is updated as work is completed and is immediately available for budget monitoring; material variances are flagged to the Case Manager and Litigation Manager. Corporate Counsel has real time visibility to performance against budget by individual, organization, i.e., firm, by case or across their portfolio. As part of the initial set up process, the Corporate Counsel and Litigation Manager will establish their criteria for standard reporting, by case and across the portfolio of cases. Summary views of active cases may be viewed on standard mobile devices that are well known in the art. Text and chat capabilities may also be employed using standard mobile devices.

L. Threat Score

The system of the present invention generates a Threat Score that is created to provide an initial assessment of a new case, predict the most likely outcome of the case and inform a unique Case Plan that allows for effective and efficient case development based upon a set of user provided criteria. The user provided criteria may be several key variables that are weighted based upon their expected impact on relevant business objectives. The Threat Score then informs desirable allocation of time and resources for a case. In this manner, the system applies data and analytics to determine the best fit solution and provides a useful and meaningful measure for decision makers to rely upon as justification for a particular recommended case strategy. Thus, the system allows for reasoned decision-making based upon analytics as opposed to uninformed judgment. Reliance on the Threat Score for case management and planning is advantageous because it allows stakeholders and decision makers to efficiently plan case management on the basis of valuable data and analytics.

As the case progresses, additional input data is available and added to the system, thus continuously provides more accurate and reliable output and increasing the confidence level of the results.

M. Outcome Range Predictor

Figure 2:
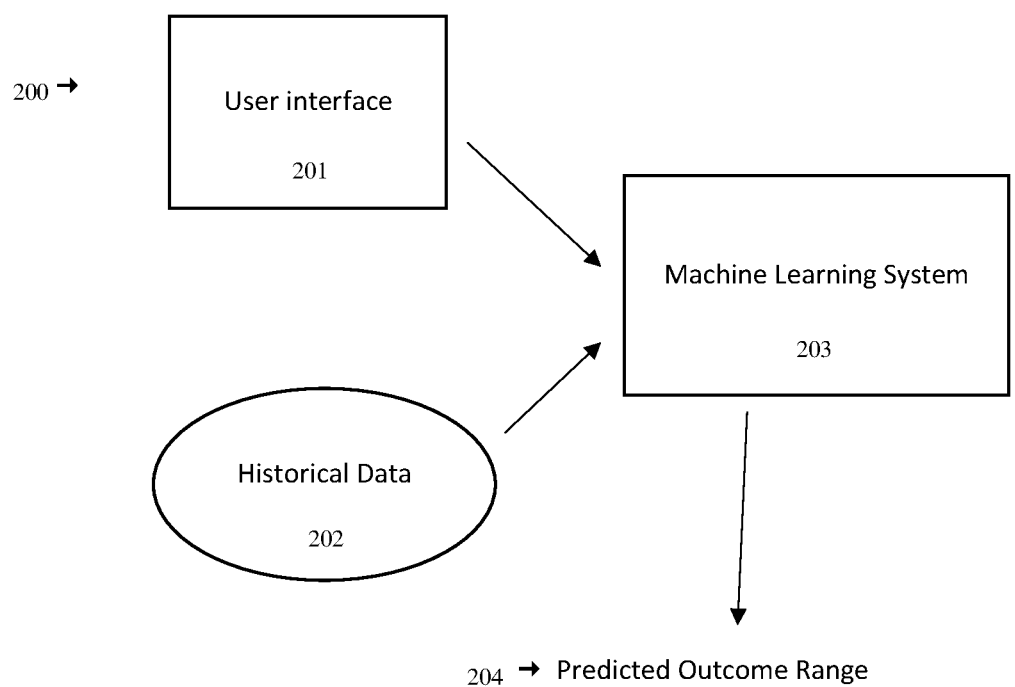
FIG. 2 is an illustration representing the machine learning system.

As shown in FIG. 2, the preferred embodiment of the present invention includes a machine learning system 203 that employs a user interface 201 that functions as an input data source for the machine learning system 203. The machine learning system 203 generates a predicted outcome range 204 for one or more pending cases. The machine learning system 203 functions to interact with the user interface 201 to receive key variable inputs for predicting the likely outcome of a case. The machine learning system 203 may be implemented by way of one or more specifically configured web or private computing servers or any other suitable implementation system or method. As the machine learning system 203 acquires additional input data, it continuously improves and provides more accurate and reliable output and the confidence level of the results will continue to increase.

Figure 3:
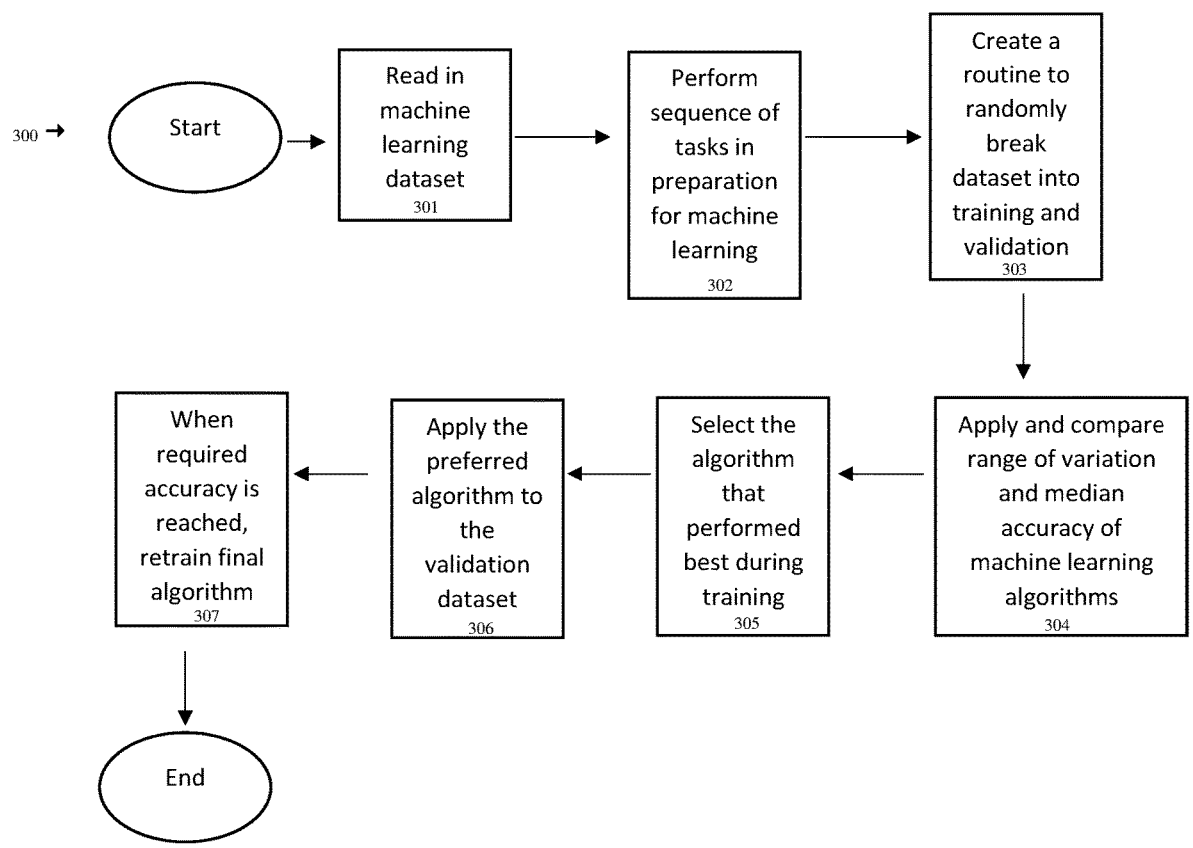
FIG. 3 is an example schematic illustrating the method of using machine learning to generate predicted outcome ranges.

FIG. 3 illustrates an example method of using machine learning to generate predicted outcome ranges. The method uses a number of different machine learning algorithms to apply to user provided data. The method will be described as being performed by a computer system comprising one or more computers. A large dataset containing the largest possible number of key variables from resolved cases is read into the system 301. These variables may include the plaintiff's age, diagnostic information, date of service, judge, jurisdiction, and any other case specific data. The method further includes a series of steps in preparation for machine learning, preferably including: the step of converting the categorical variables into integers and eliminating features with zero or near-zero variance; the step of replacing missing data for any category of variable preferably by substituting the mean of the variables of that category or by use of any other suitable similarity measure known in the art, such as KNN imputation or Tree Bagging, wherein the missing data replacement strategy that leads to the highest training accuracy is selected; converting the date format into separate columns with day, month and year; and ensuring the target variable contains no missing data. The method of the invention is not limited to these particular steps and any other known steps to prepare data for machine learning may be employed.

The method requires using a routine to randomly break the available dataset into a training dataset and a validation dataset 303. For larger datasets where the data points are in the thousands, it is preferable to separate 10% of the data for testing and validation purposes and 90% of the data for training. For smaller datasets, it is preferable to separate 20% of the data for testing and validation and 80% of the data for training. This dataset break up must be performed randomly to optimize the bias/variance tradeoff and to minimize the risk of overtraining. The method illustrated in the preferred embodiment of FIG. 3 advantageously employs at least ten-fold cross validation with three repeats in the training phase.

For the machine learning training, the method preferably involves applying and comparing the range of variation and the median accuracy of the following machine learning algorithms: generalized regression (or multivariate linear regression), logistic regression, Bayesian classifier, KNN, support vector machine, classification and regression trees, C5.0, Random Forest and Extreme Gradient Boosting Machine 304. Because each of these machine learning algorithms may perform differently with different datasets, it is preferable to try them all for each kind of data and for purposes of re-training the algorithm. For example, if data from a large number of new resolved cases is incorporated into the training database, algorithm re-training is advantageous. Other known suitable machine learning algorithms may be employed for this step in the method of the present invention.

Figure 4:
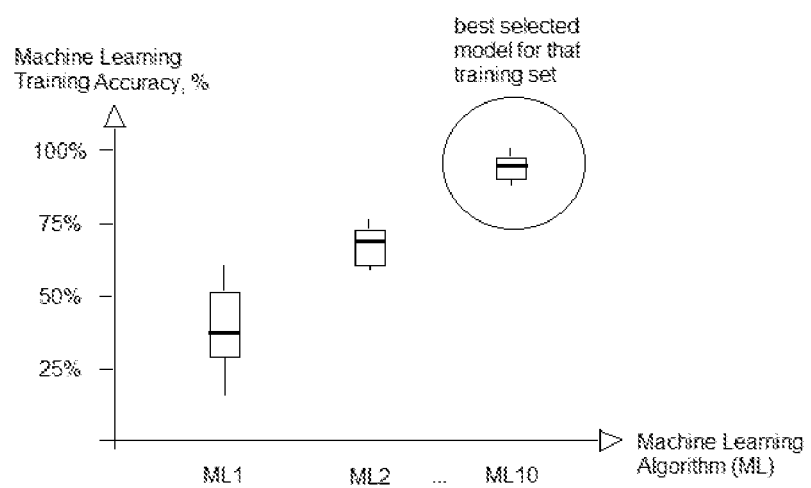
FIG. 4 is a boxplot illustrating the selection of the preferred machine learning algorithm.

In the preferred embodiment illustrated in FIG. 3, for the training and selection of the preferred machine algorithm, the training dataset is randomly broken into folds. In the preferred embodiment, there are ten folds (Folds 1-10). Folds 2 through 10 are used to train the model and fit the model using Fold 1. The model accuracy for Fold 1 is calculated. This is repeated three times for all Folds, yielding thirty calculated accuracies, whose results are plotted in a boxplot as shown in FIG. 4. The boxplots are ordered by their median accuracy and the one that provides the highest median accuracy and lowest variance is selected 305.

After training and selection of the preferred machine learning algorithm that performed best during the training, the preferred algorithm is applied to the separated test or validation dataset 306. The final accuracy of the algorithm should be close to that of the training phase thanks to the cross-validation training procedure that seeks to optimize the bias-variance tradeoff.

When the required accuracy is attained, the system retrains the preferred algorithm with the full dataset in preparation to make outcome predictions on new data (i.e., data that is not used for training or testing/validation) 307.

To facilitate interaction between users, including for the input and receipt of communications, information and data, the systems, methods and techniques described herein can be implemented on computers having a display device (i.e., a monitor) for displaying information to the user and a keyboard, mouse and other known implements that enable the user to input information into a computer.

The systems, methods and techniques described herein can be implemented by use of any known, suitable computing systems such as computing systems having a back end component (i.e., a data server), or including a middle-ware component or including front end components (i.e., client computers having a graphical user interface or an internet browser through which a user can interact with an implementation of the systems, methods and techniques described herein) or any combination of back end, middle end and front end components that are known in the art. The components of the system of the present invention can advantageously be interconnected by any suitable known form or medium of digital communication, such as a communication network including a local area network, a wide area network and the Internet. The systems of the present invention described herein may also include clients and servers that are remote from one another and operably connected via a communication network. The relationship of clients and servers may arise through computer programs running on computers having a client-server relationship with one another.

Having described the preferred embodiment of the present invention, any number of changes, variations and improvements which may be apparent to those skilled in the art are within the scope of the invention claimed and described herein. The embodiment was chosen and described to best explain the principles of the invention and its practical application to persons of ordinary skill in the art, but the application of this technology and methodology applies across all types of litigation and across all types of complex projects in different industries. As various modifications could be made to the exemplary embodiment(s), as described above with reference to the accompanying figures and illustrations, without departing from the scope of the invention, it is intended that all matter contained in the foregoing description and shown in the accompanying drawings shall be interpreted as illustrative rather than limiting. Accordingly, the breadth and scope of the present invention should not be limited by the exemplary embodiment(s) described herein, but should be defined only in accordance with the following claims and their equivalents. Although omitted for brevity and conciseness, the preferred embodiments include every combination and permutation of the implementations of the systems and methods described herein.

What is claimed is:

1. A system for strategic management of litigation comprising:
    at least one user interface that allows the input of case specific information relevant to a plurality of cases across a plurality of portfolios that is in operable communication with a computer processor;
    a plurality of workflow computers in networked communication with said computer processor and each having a monitor screen display;
    wherein said computer processor
        receives said case specific information;
        automatically generates prioritized individual task lists that are based upon said input of case specific information and causes actions to be performed based on the prioritized individual task lists;
        transmits said task lists to at least one user, who may view said task list on at least one of said monitor screen displays of said workflow computers;
        performs a machine learning method to generate one or more predicted outcome ranges including the steps of:
            reading into the system a dataset containing objective, non-judged key variables from resolved cases;
            converting said variables into integers;
            eliminating variables with zero or near-zero variance;
            replacing missing data for any category of variable by substituting the mean of the variables of said category;
            converting any date format variables into separate columns with day, month and year;
            identifying a target variable and ensuring said target variable contains no missing data;
            breaking said dataset into a training dataset and a validation dataset;
            applying and comparing a range of variation and a median accuracy of a machine learning algorithm;
            training said machine learning algorithm, the training including:
                applying and comparing a range of variation and median accuracy of a plurality of different machine learning algorithms;
                randomly breaking said training dataset into a plurality of folds;
                calculating multiple model accuracies for each fold;
                plotting said model accuracies in a plurality of boxplots;
                selecting a preferred machine learning algorithm based upon said boxplot that shows a highest median accuracy and a lowest variance;
                applying said preferred machine learning algorithm to said training dataset or validation dataset;
        generates an outcome prediction for at least one new case introduced into the system;
        retrains said preferred machine learning algorithm in preparation to make outcome predictions on new data;
        transmits said outcome prediction to a user; and causes an action to be taken based upon the outcome prediction.

2. The system according to claim 1, wherein said individual task list comprises task details, deadlines, timeline information, approved activities and time allocation.

3. The system according to claim 1, wherein said individual task list comprises tasks across multiple organizations and portfolios.

4. The system according to claim 1, configured to generate a numerical threat score indicating an overall risk of a case relative to other cases, providing an initial assessment of a case and predicting a likely outcome of a case.

5. The system according to claim 4, wherein generating said threat score includes applying a distinct weight to a plurality of variables based upon each of said variable's expected impact on relevant business objectives.

6. The system according to claim 4, wherein in response to computing said threat score, a decision-maker determines a case management strategy.

7. The system of claim 1, wherein said machine learning method includes the step of replacing missing data using K-nearest neighbor imputation or tree bagging.

8. The system of claim 1, wherein said training dataset comprises 80% of said dataset and said validation dataset comprises 20% of said dataset.

9. A method for strategic management of litigation comprising:
    implementing at least one user interface that is in operable communication with a computer processor to input case specific information from said user interface to said computer processor;

implementing said computer processor to receive said case specific information from said user interface via a communication network;

implementing said computer processor to automatically generate a prioritized individual task list;

implementing said computer processor to send said prioritized individual task list to at least one user, wherein said user interface comprises a monitor screen display that allows said user to view said prioritized individual task list and implementing said computer processor to generate a prioritized individual task list that is based upon said input of case specific information, can be viewed on said monitor screen displays of said workflow computers and causes actions to be performed based on the prioritized individual task list;

perform a machine learning method to generate one or more predicted outcome ranges including the steps of:

reading a dataset containing objective, non-judged key variables from resolved cases;

converting said variables into integers;

eliminating variables with zero or near-zero variance;

replacing missing data for any category of variable by substituting the mean of the variables of said category;

converting any date format variables into separate columns with day, month and year;

identifying a target variable and ensuring said target variable contains no missing data;

breaking said dataset into a training dataset and a validation dataset;

applying and comparing a range of variation and a median accuracy of a machine learning algorithm;

training said machine learning algorithm, the training including:

applying and comparing a range of variation and median accuracy of a plurality of different machine learning algorithms;

randomly breaking said training dataset into a plurality of folds;

calculating multiple model accuracies for each fold;

plotting said model accuracies in a plurality of boxplots;

selecting a preferred machine learning algorithm based upon said boxplot that shows a highest median accuracy and a lowest variance;

applying said preferred machine learning algorithm to said training dataset or validation dataset;

generate an outcome prediction for at least one new case;

retrain said preferred machine learning algorithm in preparation to make outcome predictions on new data; and transmit said outcome prediction to a user and cause an action to be taken based upon the outcome prediction.

10. The method according to claim 9, wherein said prioritized individual task list comprises task details, deadlines, timeline information, approved activities and time allocation.

11. The method according to claim 9, wherein said prioritized individual task list comprises tasks across multiple organizations and portfolios.

12. The method according to claim 9, wherein said method further includes the step of computing a numerical threat score that indicates the overall risk of a case relative to other cases, providing an initial assessment of a case and predicting a likely outcome of a case.

13. The method according to claim 12, wherein the step of computing a numerical threat score includes applying a distinct weight value to at least one or more variables and computing said threat score based upon said weight attributed to said variables.

14. The method of claim 9, wherein the step of replacing missing data uses K-nearest neighbor imputation method.

15. The method of claim 9, wherein the step of replacing missing data uses tree bagging method.

16. The method of claim 9, wherein said training dataset comprises 80% of said dataset and said validation dataset comprises 20% of said dataset.

* * * * *